United States Patent Office 3,792,053
Patented Feb. 12, 1974

3,792,053
3-(1,2,3,4-TETRAHYDROISOQUINOLINOMETHYL)-
3-QUINUCLIDINOL
John R. Potoski, Rosemont, and Meier E. Freed, Paoli,
Pa., assignors to American Home Products Corporation, New York, N.Y.
No Drawing. Original application July 15, 1970, Ser. No. 55,264, now Patent No. 3,725,410, dated Apr. 3, 1973. Divided and this application Aug. 7, 1972, Ser. No. 278,663
Int. Cl. C07d 33/10
U.S. Cl. 260—288 R          1 Claim

ABSTRACT OF THE DISCLOSURE

This invention is concerned with new and novel derivatives of 3-aminomethyl-3-quinuclidinols which are pharmacologically active as CNS depressants useful in the calming of animals. Further, this invention is concerned with methods of producing the new and novel 3-aminomethyl-3-quinuclidinols. Still further, this invention is concerned with 3-methylenequinuclidine oxide which is a new and novel intermediate useful in the production of the new and novel 3-aminomethyl-3-quinuclidinol derivatives of the present invention.

This is a division of application Ser. No. 55,264, filed July 15, 1970, now U.S. Pat. No. 3,725,410, granted Apr. 3, 1973.

This invention relates to new and novel 3-quinuclidinol derivatives. Particularly, this invention relates to new and novel 3-aminomethyl-3-quinuclidinol derivatives which in standard and accepted pharmacological tests have demonstrated activity as CNS depressants useful in the calming of animals. Further, this invention is concerned with the production of the new and novel 3-aminomethyl-3-quinuclidinols and with the new and novel compound 3-methylenequinuclidine oxide useful as an intermediate in the production of the new and novel 3-aminomethyl-3-quinuclidinol derivatives as hereinafter set forth. Additionally, certain of the compounds of the present invention when tested in standard and acceptable pharmacological tests demonstrate activity as anti-inflammatory agents.

The new and novel compounds of the present invention are represented by those having the structural formula:

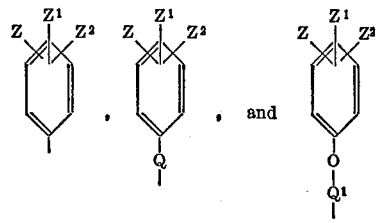

wherein X is selected from the group consisting of:
(i) morpholino;
(ii)

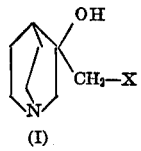

wherein R is selected from the group consisting of (lower)alkyl, hydroxy(lower)alkyl,

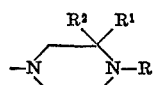

wherein Q is (lower)alkylene, $Q^1$ is a straight-chain alkylene of from 2 to about 6 carbon atoms, Z and $Z^2$ are nonadjacent and selected from the group consisting of hydrogen, hydroxy, trifluoromethyl, amino, halo, (lower)alkoxy and (lower)alkyl, and $Z^1$ is selected from the group consisting of hydrogen, halo, (lower)alkoxy and (lower)alkyl, with the proviso that when Z, $Z^1$ and $Z^2$ are not hydrogen they are the same; and $R^1$ and $R^2$ are selected independently from the group consisting of hydrogen, (lower)alkyl,

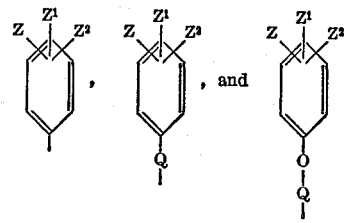

wherein Q, Z, $Z^1$ and $Z^2$ are as hereinabove set forth;

(iii)

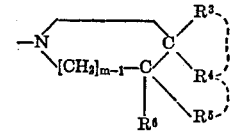

wherein $m$ is 1, 2 or 3, $R^3$, $R^5$ and $R^6$ are hydrogen and $R^4$ is selected from the group consisting of hydrogen, (lower)alkyl, and

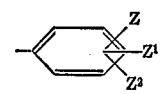

wherein Z, $Z^1$ and $Z^2$ are as hereinabove set forth; $m$ is 1 or 2, $R^5$ and $R^6$ are hydrogen and $R^3$ and $R^4$ are concatenated to form with the carbon atom to which they are attached a carbocyclic structure of from about 5 to about 8 carbon atoms; and $m$ is 2 and $R^4$ and $R^5$ are concatenated to form with $R^3$, $R^6$ and the carbon atoms to which they are attached a benzene ring or a benzene ring substituted with 1 to 3 members selected from the group consisting of halo, (lower) alkoxy and (lower)alkyl or substituted with 1 or 2 nonadjacent members selected from the group consisting of hydroxy, trifluoromethyl and amino; and (iv)

wherein $R^7$ is selected from the group consisting of hydrogen, (lower)alkyl,

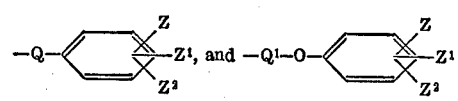

wherein Q, $Q^1$, Z, $Z^1$ and $Z^2$ are as hereinabove set forth; and $R^8$ is selected from the group consisting of $R^7$,

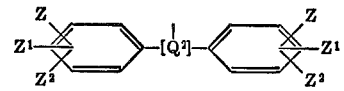

wherein $Q^2$ is (lower)alkyl and Z, $Z^1$ and $Z^2$ are as hereinabove set forth, and

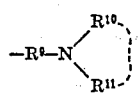

wherein $R^9$ is alkylene of from 2 to about 4 carbon atoms and $R^{10}$ and $R^{11}$ are each (lower)alkyl or are concatenated to form with the nitrogen atom to which they are attached a nitrogen containing heterocyclic ring containing from about 4 to about 8 carbon atoms; and non-toxic pharmaceutically acceptable acid addition salts thereof.

Of particular interest are the new and novel compounds of the present invention which are represented by the class of those having the following structural formula:

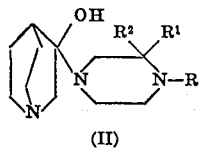

(II)

wherein R, $R^1$ and $R^2$ are as set forth in Formula I, and non-toxic pharmaceutically acceptable acid addition salts thereof. Typical compounds of Formula II are: 3-(4-phenylpiperazinomethyl)-3-quinuclidinol; and 3-(3,3-diphenylpiperazinomethyl)-3-quinuclidinol; and

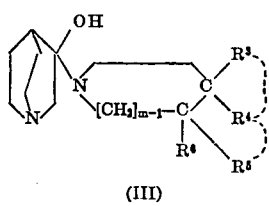

(III)

wherein $m$, $R^3$, $R^4$, $R^5$ and $R^6$ are as set forth in Formula I, and non-toxic pharmaceutically acceptable acid addition salts thereof, including compounds having the structural formula:

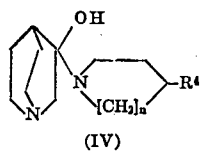

(IV)

wherein $n$ is 1, 2 or 3 and $R^4$ is selected from the group consisting of hydrogen, (lower)alkyl and

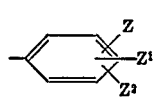

wherein Z, $Z^1$ and $Z^2$ are as set forth in Formula I, and non-toxic pharmaceutically acceptable acid addition salts thereof and compounds having the structural formula:

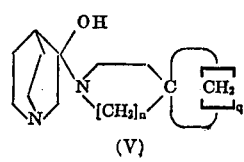

(V)

wherein $n$ is 1, 2 or 3 and $q$ is a number from about 4 to about 7, and the non-toxic pharmaceutically acceptable acid addition salts thereof. A typical compound of Formula V is 3-[(3-azaspiro[5,5]undecino)methyl]-3-quinuclidinol; and compounds of Formula III having the structural formula:

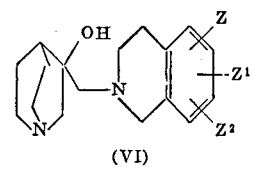

(VI)

wherein Z, $Z^1$ and $Z^2$ are set forth in Formula I, and non-toxic pharmaceutically acceptable acid addition salts thereof. A typical compound of Formula VI is: 3-(1,2,3,4-tetrahydroisoquinolinomethyl) - 3-quinuclidinol; and compounds having the structural formula:

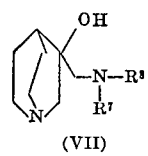

(VII)

wherein $R^7$ and $R^8$ are as set forth in Formula I, and non-toxic pharmaceutically acceptable acid addition salts thereof, particularly, compounds having the formula:

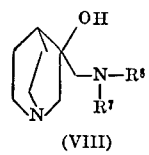

(VIII)

wherein $R^7$ is as set forth in Formula I and $R^8$ is selected from the group consisting of $R^7$ and

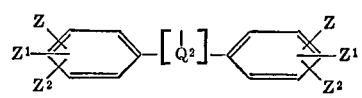

wherein $Q^2$, Z, $Z^1$ and $Z^2$ are as set forth in Formula I and non-toxic pharmaceutically aceptable acid addition salts thereof, the compounds of Formula VII having the structural formula:

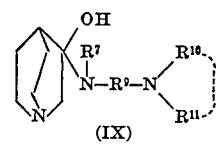

(IX)

wherein $R^7$ is selected from the group consisting of hydrogen and (lower)alkyl, $R^9$ is alkylene having from 2 to about 4 carbon atoms, and $R^{10}$ and $R^{11}$ are each (lower)alkyl or are concatenated to form a straight chain alkylene group of from about 4 to about 8 carbon atoms; and non-toxic pharmaceutically acceptable acid addition salts thereof.

The compounds of the present invention, Formula I, are prepared by several methods. Pictorially, some of these routes of production are represented as follows:

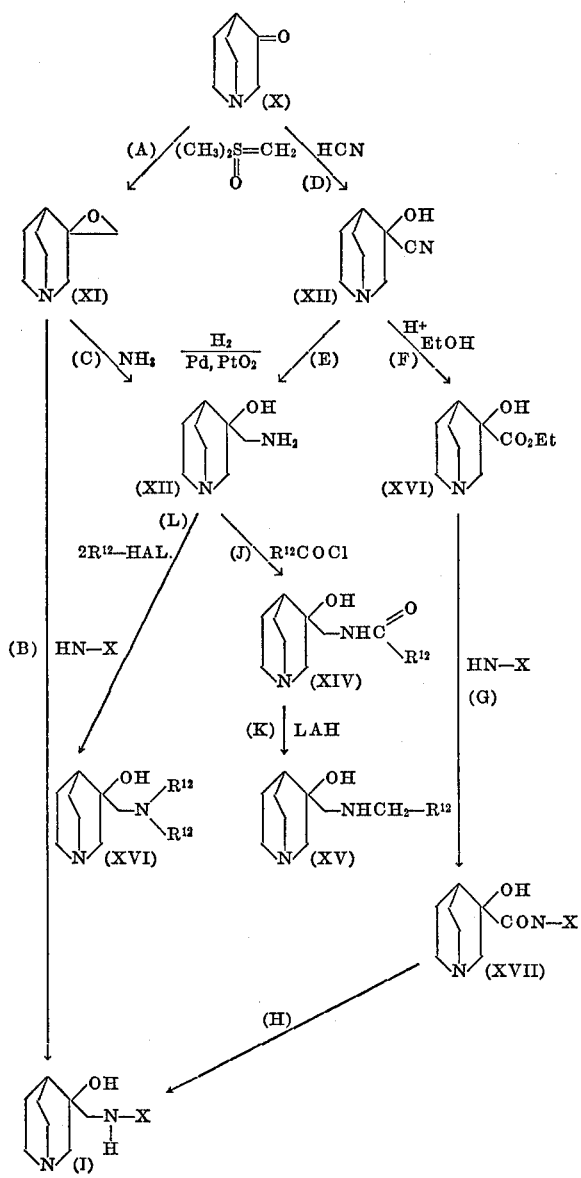

wherein X is as previously set forth, $R^{12}$ is (lower)alkyl, Hal. is a halogen such as fluorine, bromine, iodine or chlorine, and LAH is lithium aluminum hydride.

In the preferred synthesis,

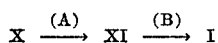

3-quinuclidone is reacted by heating at about 50° C. for about one hour in a mixture of a 50% dispersion of sodium hydride in Nujol, dimethylsulfoxide and trimethylsulfoxonium iodide. The mixture is cooled and extracted with a suitable inert organic solvent such as dichloromethane which is washed with an aqueous salt solution (NaCl) and dried (over $MgSO_4$). Removal of the drying agent provides 3-methylenequinuclidine oxide (XI). The compound (XI) is then reacted with an appropriate compound of the formula HN—X by heating at a temperature ranging from about 150° C. to about 220° C. for a time period ranging from about ten minutes to about one hour. Upon cooling, the reaction mixture is extracted with an appropriate inert organic solvent (i.e. dichloromethane, ether, ethylacetate, hexane) followed by routine recovery procedures, such as filtering and recrystallization.

When used herein and in the appended claims, the terms "(lower)alkoxy," "(lower)alkyl," "(lower)alkylene" and the like contemplates hydrocarbon containing radicals, straight and branched chain, containing from about 1 to about 6 carbon atoms, and includes groupings such as methyl, ethyl, n-propyl, i-propyl, n-butyl, t-butyl, n-pentyl, n-hexyl, 2-methylpentyl, and the like. The terms "halo" or "halogen" when used alone or in association with groups such as (lower)alkyl or phenyl contemplates the halogens, and includes fluorine, chlorine, bromine and iodine. The starting material 3-quinuclidinone is well-kown and commercially available. The starting materials of formula HN—X are readily available or are prepared by methods known to those skilled in the art.

In accord with the present invention, the Compounds I of the present invention have been found to possess interesting pharmacological properties. More particularly, these compounds, in standard pharmacological tests, have exhibited utility as central nervous system (CNS) depressant agents which are useful in producing a calming effect on animals.

In the pharmacological evaluation of the central nervous system depressant compounds of this invention, the in vivo effects of the compounds of this invention are tested as follows:

The compound is administered orally to three mice (14 to 24 grams) at each of the following doses: 400, 127, 40 and 12.7 mg./kg. The animals are watched for a minimum of two hours during which time signs of general stimulation (i.e. increased spontaneous motor activity, hyperactivity on tactile stimulation, twitching), general depression (i.e. decreased spontaneous motor activity, decreased respiration) and autonomic activity (i.e. miosis, mydriasis, diarrhea) are noted. The animals are tested for changes in reflexes (i.e. flexor, extensor) and are rated by use of a pole climb and inclined screen for the presence of sedation-ataxia. The "Eddy Hot-Plate Method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

The compounds of this invention when administered orally in the above test procedure, induce decreased motor activity (Central Nervous System depressant activity useful in the calming of animals) at a dosage level of from 4.00 mg./kg. to 400 mg./kg. There were no deaths in the test animals at the highest dose used, 400 mg./kg., intraperitoneally.

In the pharmacological evalution of the anti-inflammatory activity of the compounds of the present invention, the in vivo effects of these compounds are tested by a modification of procedures described by Winter et al., Proc. Soc. Exp. Biol. and Med., 111:544 (1962) and Buttle et al., Nature, 179:629 (1957), which is as follows:

Male Sprague-Dawley rats 120–160 grams are used. The compound is administered orally as a solution or suspension in distilled water (plus 2 drops Tween 80), in a volume of 10 ml./kg. Each compound is given to 6 rats and vehicle alone is administered to 6 more rats as a control. Sixty minutes after drug administration, edema is induced by an injection of 0.05 ml. of a 1% carrageenin solution in saline into the sub-plantar tissue of the rat's right hind paw. Paw volume is then immediately measured volumetrically with a plethysmorgraph and again 3 hours later. The mean volume of swelling for the control group is calculated and compared to the test groups. Compounds that inhibit swelling 23% as compared to controls are considered active. Inhibition is calculated by the formula:

Percent inhibition
$$= \frac{\text{Mean vol. swelling of control} - \text{mean vol. swelling of test}}{\text{Mean vol. swelling of control}} \times 100$$

The test is effective with such standard compounds as aspirin, phenylbutazone, hydrocortisone, indomethacin and flufenamic and mefanamic acids. The cinical correlation is excellent.

Certain compounds of this invention, when tested as described above, exhibit anti-inflammatory activity. Special notice is directed to 3-(4-phenylpiperazinomethyl)-3-quinuclidinol which demonstrated a 28% inhibitory activity as compared to the control compounds.

When the compounds of this invention are employed pharmaceutically; i.e., as CNS depressants in calming animals or as anti-inflammatory agents, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar and so forth. They may be administered orally in the form of solution or they may be injected parenterally, e.g. intra-muscularly. For parenteral administration, they may be used in the form of a sterile solution or suspensions containing other solutes, for example, enough saline or glucose to make the solution isotonic.

The dosage of the present pharmacologically active agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof. All temperatures used herein and in the appended claims are in degrees Celsius unless otherwise indicated.

EXAMPLE I 3-methylenequinuclidine oxide

Sodium hydride (4.0 g., 50% dispersion in Nujol) is dissolved in 50 ml. of dry dimethylsulfoxide, under a dry nitrogen atmosphere, at 70° to 75° and with stirring. The resulting solution is cooled to 15° and to it is added trimethylsulfoxonium iodide (16.0 g., 0.073 mole). The mixture is stirred for twenty minutes. To the mixture is then added 9.0 g. (0.070 mole) of 3-quinuclidinone. The quinuclidinone is rinsed in with an additional 10 ml. of dimethylsulfoxide. After the initial reaction subsides, the mixture is heated at 50° for one hour, cooled and diluted with 100 ml. of water. The aqueous solution is extracted with 4×50 ml. of dichloromethane. The dicsloromethane is back washed with 25 ml. of a saturated aqueous sodium chloride and dried (MgSO$_4$). Removal of the drying agent and concentration of the dichloromethane solution gives a yellow oil. Distillation of the oil gives a colorless liquid with B.P. 68–78° at 6.0 mm. and weight of 7.5 g. The distilled liquid is shown by spectroscopy to be a mixture of oxide product and dimethylsulfoxide in a ratio of approximately 2:1. Hereafter, this mixture will be designated as I.

EXAMPLE II 3-(4-phenylpiperazinomethyl)-3-quinuclidinol

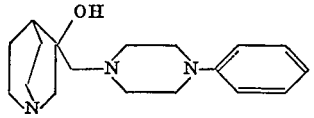

A mixture of 4.5 g. of I and 3.2 g. of N-phenylpiperazine is heated at 190° to 200° for twenty minutes and allowed to stand overnight at room temperature. The resultant partially crystalline mass is triturated with dichloromethane and filtered to give 1.45 g. of white solid product with M.P. 148–150°. Recrystallization of the solid from cyclohexane gives 1.35 g. of product with M.P. 151–152°.

Analysis.—Calcd. for $C_{18}H_{27}N_3O$ (percent): C, 71.72; H, 9.03; N, 13.94. Found (percent): C, 71.58; H, 9.03; N, 13.88.

In a similar manner, using the appropriate starting materials, the following compounds are provided:

3-(4-ethylpiperazinomethyl)-3-quinuclidinol;
3-(4-[2-(m-iodophenyl)ethyl]piperazinomethyl)-3-quinuclidinol;
3-[4-(3,5-dihydroxybenzyl)piperazinomethyl]-3-quinuclidinol;
3-(4-[2-(p-ethoxyphenyloxy)ethyl]piperazinomethyl-3-quinuclidinol;
3-(4-[2-(m-propylphenyl)ethyl]piperazinomethyl)-3-quinuclidinol;
3-(4-[2-(p-[trifluoromethyl]phenyl)ethyl]piperazinomethyl)-3-quinuclidinol;
3-[4-(p-propylphenyl)piperazinomethyl]-3-quinuclidinol;
3-[4-(p-aminobenzyl)piperazinomethyl]-3-quinuclidinol;
3-(4-[2-(p-aminophenyloxy)ethyl]piperazinomethyl)-3-quinuclidinol;
3-(4-methylpiperazinomethyl)-3-quinuclidinol;
3-[4-(o-chlorophenyl)piperazinomethyl]-3-quinuclidinol;
3-(4-[2-(3,4-dibromophenyloxy)ethyl]piperazinomethyl)-3-quinuclidinol;
3-[4-(3,4,5-trichlorobenzyl)piperazinomethyl]-3-quinuclidinol;
3-[4-(p-anisyl)piperazinomethyl]-3-quinuclidinol;
3-(4-[3-(m-isopropylphenyloxy)propyl]piperazinomethyl)-3-quinuclidinol;
3-[4-(o-tolyl)piperazinomethyl]-3-quinuclidinol;
3-(4-[4-(3,4,5-trimethylphenyloxy)butyl]piperazinomethyl)-3-quinuclidinol;
3-(4-[2,4-di(trifluoromethyl)phenyl]piperazinomethyl)-3-quinuclidinol;
3-(4-[2-(2,4-diaminophenyl)ethyl]piperazinomethyl)-3-quinuclidinol;
3-[4-(2-hydroxyethyl)piperazinomethyl]-3-quinuclidinol;
3-(4-[3-(p-fluorophenyl)propyl]piperazinomethyl)-3-quinuclidinol;
3-[4-(m-hydroxyphenyl)piperazinomethyl]-3-quinuclidinol;
3-[4-(3,4,5-trimethoxyphenyl)piperazinomethyl]-3-quinuclidinol;
3-(4-[3-(3,5-diethylphenyloxy)propyl]piperazinomethyl)-3-quinuclidinol;
3-(4-[3,5-di(trifluoromethyl)phenyloxyethyl]piperazinoethyl)-3-quinuclidinol;
3-(4-[2-(2,4-dihydroxyphenyloxy)ethyl]piperazinomethyl)-3-quinuclidinol;
3-[4-(p-bromophenyl)piperazinomethyl]-3-quinuclidinol;
3-(4-isopropylpiperazinomethyl)-3-quinuclidinol;
3-(4-[2-(phenoxy)ethyl]piperazinomethyl)-3-quinuclidinol;
3-[4-(p-chlorobenzyl)piperazinomethyl]-3-quinuclidinol;

3-[4-(3,5-dihydroxyphenyl)piperazinomethyl]-3-quinuclidinol;
3-[4-(3,4,5-trimethoxybenzyl)piperazinomethyl]-3-quinuclidinol;
3-[4-(2-[p-(trifluoromethyl)phenyl]ethyl)piperazinomethyl]-3-quinuclidinol;
3-(4-hexylpiperazinomethyl)-3-quinuclidinol;
3-[4-(3,5-diaminophenyl)piperazinomethyl]-3-quinuclidinol;
3-(4-[3-(p-fluorophenyloxy)propyl]piperazinomethyl)-3-quinuclidinol;
3-(4-[2-(m-anisyl)ethyl]piperazinomethyl)-3-quinuclidinol;
3-(4-[2-(p-tolyloxy)ethyl]piperazinomethyl)-3-quinuclidinol;
3-[4-(o-bromobenzyl)piperazinomethyl]-3-quinuclidinol;
3-(4-[2-(m-hydroxyphenyloxy)ethyl]piperazinomethyl-3-quinuclidinol;
3-[4-(m-ethoxyphenyl)piperazinomethyl]-3-quinuclidinol;
3-[4-(p-isopropylbenzyl)piperazinomethyl]-3-quinuclidinol;
3-[4-(p-iodophenyl)piperazinomethyl]-3-quinuclidinol;
3-[4-(2,4-dihydroxybenzyl)piperazinomethyl]-3-quinuclidinol;
3-(4-[2-(3,5-diethoxyphenyloxy)ethyl]piperazinomethyl)-3-quinuclidinol;
3-[4-(3,4-diethylphenyl)piperazinomethyl]-3-quinuclidinol;
3-[4-(3,5-dibromobenzyl)piperazinomethyl]-3-quinuclidinol;
3-[4-(2-phenylethyl)piperazinomethyl]-3-quinuclidinol;
3-[4-(3,4,5-trichlorophenyl)piperazinomethyl]-3-quinuclidinol;
3-[4-(3,4,5-trimethylbenzyl)piperazinomethyl]-3-quinuclidinol;
3-(4-[3-(p-chlorophenyloxy)propyl]piperazinomethyl)-3-quinuclidinol;
3-(4-[2-(m-hydroxyphenyl)ethyl]piperazinomethyl)-3-quinuclidinol;
3-(4-[2-(3,4,5-trimethoxyphenyloxy)ethyl]piperazinomethyl)-3-quinuclidinol;
3-[4-(3,5-diethoxybenzyl)piperazinomethyl]-3-quinuclidinol;
3-[4-(m-aminophenyl)piperazinomethyl]-3-quinuclidinol;
3-[4-(2-hydroxypropyl)piperazinomethyl]-3-quinuclidinol;
3-(4-[2-(p-iodophenyloxy)ethyl]piperazinomethyl)-3-quinuclidinol;
3-(4-[4-(3,5-dihydroxyphenyloxy)butyl]piperazinomethyl)-3-quinuclidinol;
3-(4-benzylpiperazinomethyl)-3-quinuclidinol;
3-[4-(p-fluorophenyl)piperazinomethyl]-3-quinuclidinol;
3-(4-[2-(p-anisyl)ethyl]piperazinomethyl)-3-quinuclidinol;
3-[4-(3,5-dibromophenyl)piperazinomethyl]-3-quinuclidinol;
3-[4-(m-isopropylphenyl)piperazinomethyl]-3-quinuclidinol;
3-(4-[2-(3,5-diaminophenyloxy)propyl]piperazinomethyl)-3-quinuclidinol;
3-(4-[3-(p-bromophenyloxy)butyl]piperazinomethyl)-3-quinuclidinol;
3-[4-(3,5-diethoxyphenyl)piperazinomethyl]-3-quinuclidinol;
3-[4-(p-methylbenzyl)piperazinomethyl]-3-quinuclidinol;
3-(4-[p-trifluoromethyl)phenyl]piperazinomethyl)-3-quinuclidinol;
3-(4-[2-(3,5-diaminophenyloxy)ethyl]piperazinomethyl)-3-quinuclidinol;
3-(4-[2-(p-ethoxyphenyl)ethyl]piperazinomethyl)-3-quinuclidinol;
3-(4-[2-(p-propylphenyloxy)ethyl]piperazinomethyl)-3-quinuclidinol;
3-[4-(3,4,5-trimethylphenyl)piperazinomethyl)-3-quinuclidinol;
3-(4-[3,5-di(trifluoromethyl)benzyl]piperazinomethyl)-3-quinuclidinol;
3-(4-[2-(p-anisyloxy)ethyl]piperazinomethyl)-3-quinuclidinol;
3-[4-(3,4,5-trimethoxyphenyl)piperazinomethyl]-3-quinuclidinol.

EXAMPLE III 3-(3,3-diphenylpiperazinomethyl)-3-quinuclidinol

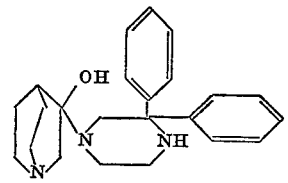

A mixture of I (2.5 g.) and 3,3-diphenylpiperazine (3.8 g.) is heated at 180° to 190° for twenty-five minutes. On cooling, crystallization occurs. The crystals are triturated with ethylacetate and filtered to give 2.8 g. of white solid with M.P. 126–145°. Recrystallization of the solid from ethylacetate gives 2.2 g. of product with M.P. 136–148°, this material is heated in a sublimation apparatus for three hours at 130° under 0.1 mm. pressure. The unsublimed portion weighs 1.9 g. and has M.P. 146–148° and is a pure product.

*Analysis.*—Calcd. for $C_{24}H_{31}N_3O$ (percent): C, 76.35; H, 8.28; N, 11.13. Found (percent): C, 76.35; H. 8.14; N, 10.85.

In a similar manner, using the appropriate starting materials, the following compounds are provided:

3-(3-[3,5-di(trifluoromethyl)benzyl]piperazinomethyl)-3-quinuclidinol;
3-[3-(3,4,5-trimethylphenyl)piperazinomethyl)-3-quinuclidinol;
3-(3-[2-(p-propylphenyloxy)ethyl]piperazinomethyl)-3-quinuclidinol;
3-(3-[2-(p-ethoxyphenyl)ethyl]piperazinomethyl)-3-quinuclidinol;
3-[3-(2,4,6-trichlorophenyloxymethyl)piperazinomethyl]-3-quinuclidinol;
3-(3-[2-(3,5-diaminophenyloxy)ethyl]piperazinomethyl)-3-quinuclidinol;
3-(3-[p-trifluoromethyl)phenyl]piperazinomethyl)-3-quinuclidinol;
3-[4-(3,5-dihydroxyphenyl)piperidinomethyl]-3-quinuclidinol;
3-[3-(3,5-diethoxyphenyl)piperazinomethyl]-3-quinuclidinol;
3-(3-(p-bromophenyloxymethyl)piperazinomethyl]-3-quinuclidinol;
3-[3-(3,5-diaminophenyloxymethyl)piperazinomethyl]-3-quinuclidinol;
3-[3-(m-isopropylphenyl)piperazinomethyl]-3-quinuclidinol;
3-[3-(3,5-dibromophenyl)piperazinomethyl)-3-quinuclidinol;
3-(3,3-diethylpiperazinomethyl)-3-quinuclidinol;
3-(3-[2-(p-anisyl)ethyl]piperazinomethyl)-3-quinuclidinol;
3-[-3-(p-fluorophenyl)piperazinomethyl]-3-quinuclidinol;
3-(3-benzylpiperazinomethyl)-3-quinuclidinol;
3-[3-(3,5-dihydroxyphenyloxymethyl)piperazinomethyl]3-quinuclidinol;
3-(3-[2-(p-iodophenyloxy)ethyl]piperazinomethyl]-3-quinuclidinol;
3-[3-(2-hydroxypropyl)piperazinomethyl]-3-quinuclidinol;

3-[3-(m-aminophenyl)piperazinomethyl]-3-quinuclidinol;
3-(3-[3,5-di(trifluoromethyl)phenyloxymethyl]-piperazinomethyl)-3-quinuclidinol;
3-[3-(3,5-diethoxybenzyl)piperazinomethyl]-3-quinuclidinol;
3-[3-(3,4,5-trimethoxyphenyloxymethyl)piperazinomethyl]-3-quinuclidinol;
3-(3-[2-(m-hydroxyphenyl)ethyl]piperazinomethyl)-3-quinuclidinol;
3-[3-(p-chlorophenyloxymethyl)piperazinomethyl]-3-quinuclidinol;
3-[3-(3,4,5-trimethylbenzyl)piperazinomethyl]-3-quinuclidinol;
3-[3-(3,4,5-trichlorophenyl)piperazinomethyl]-3-quinuclidinol;
3-[3-(2-phenylethyl)piperazinomethyl]-3-quinuclidinol;
3-[3-(3,5-dibromobenzyl)piperazinomethyl]-3-quinuclidinol;
3-[3-(3,4-diethylphenyl)piperazinomethyl]-3-quinuclidinol;
3-[3-(3,5-diethoxyphenyloxymethyl)piperazinomethyl[-3-quinuclidinol;
3-[3-(p-iodophenyl)piperazinomethyl]-3-quinuclidinol;
3-(3-[3,5-tri(trifluoromethyl)phenyl]piperazinomethyl)-3-quinuclidinol;
3-[3-(p-isopropylbenzyl)piperazinomethyl]-3-quinuclidinol;
3-[3-(m-ethoxyphenyl)piperazinomethyl]-3-quinuclidinol;
3-(3-[3-(m-hydroxyphenyloxy)ethyl]piperazinomethyl)-3-quinuclidinol;
3-[3-(o-bromobenzyl)piperazinomethyl]-3-quinuclidinol;
3-(3,3-dimethylpiperazinomethyl)-3-quinuclidinol;
3-[3-(p-tolyloxymethyl)piperazinomethyl]-3-quinuclidinol;
3-(3-[2-(m-anisyl)ethyl]piperazinomethyl)-3-quinuclidinol;
3-(3-[3-(p-fluorophenyloxy)propyl]piperazinomethyl)-3-quinuclidinol;
3-[3-(3,5-diaminophenyl)piperazinomethyl]-3-quinuclidinol;
3-(3-hexylpiperazinomethyl)-3-quinuclidinol;
3-[3-(2-[p-(trifluoromethyl)phenyl]ethyl)piperazinomethyl]-3-quinuclidinol;
3-[3-(3,4,5-trimethoxybenzyl)piperazinomethyl]-3-quinuclidinol;
3-[3-(3,5-dihydroxyphenyl)piperazinomethyl]-3-quinuclidinol;
3-[3-(p-chlorobenzyl)piperazinomethyl]-3-quinuclidinol;
3-(3-[2-(phenoxy)ethyl]piperazinomethyl)-3-quinuclidinol;
3-(3-isopropylpiperazinomethyl)-3-quinuclidinol;
3-[3-(p-bromophenyl)piperazinomethyl]-3-quinuclidinol;
3-(3-[3,5-di(trifluoromethyl)phenyloxymethyl]piperazinomethyl)-3-quinuclidinol;
3-[3-(3,5-diethylphenyloxymethyl)piperazinomethyl]-3-quinuclidinol;
3-[3-(3,4,5-trimethoxyphenyl)piperazinomethyl]-3-quinuclidinol;
3-[3-(m-hydroxyphenyl)piperazinomethyl]-3-quinuclidinol;
3-(3-[3-(p-fluorophenyl)propyl]piperazinomethyl)-3-quinuclidinol;
3-[3,3-di(p-chlorophenyl)piperazinomethyl]-3-quinuclidinol;
3-[3-(2-hydroxyethyl)piperazinomethyl]-3-quinuclidinol;
3-(3-[2-(2,4-diaminophenyl)ethyl]piperazinomethyl)-3-quinuclidinol;
3-[3-(3,4,5-trimethylphenyloxymethyl)piperazinomethyl]-3-quinuclidinol;
3-[3-(o-tolyl)piperazinomethyl]-3-quinuclidinol;
3-[3-(m-isopropylphenyloxymethyl)piperazinomehtyl]-3-quinuclidinol;

3-[3-(p-anisyl)piperazinomethyl]-3-quinuclidinol;
3-[3-(3,4,5-trichlorobenzyl)piperazinomethyl]-3-quinuclidinol;
3-[3-(3,4-dibromophenyloxymethyl)piperazinomethyl]-3-quinuclidinol;
3-[3-(o-chlorophenyl)piperazinomethyl]-3-quinuclidinol;
3-(3-methylpiperazinomethyl)-3-quinuclidinol;
3-(3,3-dibenzylpiperazinomethyl)-3-quinuclidinol;
3-[3-(p-aminophenyloxymethyl)piperazinomethyl]-3-quinuclidinol;
3-[3-(p-aminobenzyl)piperazinomethyl]-3-quinuclidinol;
3-[3-(p-propylphenyl)piperazinomethyl]-3-quinuclidinol;
3-(3-[2-(p-[trifluoromethyl]phenyl)ethyl]piperazinomethyl)-3-quinuclidinol;
3-(3-[2-(m-propylphenyl)ethyl]piperazinomethyl)-3-quinuclidinol;
3-(3-[2-(p-ethoxyphenyloxy)ethyl]piperazinomethyl)-3-quinuclidinol;
3-[3-(3,5-dihydroxybenzyl)piperazinomethyl]-3-quinuclidinol;
3-(3-[2- m-iodophenyl)ethyl]piperazinomethyl)-3-quinuclidinol;
3-(3-phenoxymethylpiperazinomethyl)-3-quinuclidinol;
3-(3-ethylpiperazinomethyl)-3-quinuclidinol;
3-(3-phenylpiperazinomethyl)-3-quinuclidinol;
3-(3-[2-(p-anisyloxy)ethyl]piperazinomethyl)-3-quinuclidinol;
3-[3-(3,4,5-trimethoxyphenyl)piperazinomethyl]-3-quinuclidinol.

EXAMPLE IV 3-(4-phenylpiperidinomethyl)-3-quinuclidinol

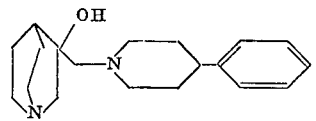

A mixture of I (3.0 g.) and 4-phenylpiperidine (4.0 g.) is heated at 200° for thirty minutes. On cooling, crystallization occurs. The crystalls are triturated with hexane-cyclohexane and filtered to give 1.5 g. of a crystalline solid which is recrystallized from hexane-cyclohexane.

In a similar manner, using the appropriate starting materials, the following compounds are provided:

3-hexahydroazepinomethyl-3-quinuclidinol;
3-piperidinomethyl-3-quinuclidinol;
3-pyrrolidinomethyl-3-quinuclidinol;
3-[4-(p-chlorophenyl)hexahydroazepinomethyl]-3-quinuclidinol;
3-[4-(3,5-dihydroxyphenyl)piperidinomethyl]-3-quinuclidinol;
3-[4-(m-ethylphenyl)hexahydroazepinomethyl]-3-quinuclidinol;
3-[3-(p-tolyl)pyrrolidinomethyl]-3-quinuclidinol;
3-[4-(2,4-diaminophenyl)piperidinomethyl]-3-quinuclidinol;
3-[4-(p-hydroxyphenyl)hexahydroazepinomethyl]-3-quinuclidinol;
3-(4-hexylpiperidinomethyl)-3-quinuclidinol;
3-[4-(2,4,6-trimethoxyphenyl)hexahydroazepinomethyl]-3-quinuclidinol;
3-(4-[m-(trifluoromethyl)phenyl]piperidinomethyl)-3-quinuclidinol;
3-[4-(3,5-dibromophenyl)hexahydroazepinomethyl]-3-quinuclidinol;
3-[3-(p-chlorophenyl)pyrrolidinomethyl]-3-quinuclidinol;
3-[4-(m-aminophenyl)hexahydroazepinomethyl]-3-quinuclidinol;
3-[4-(p-iodophenyl)hexahydroazepinomethyl]-3-quinuclidinol;
3-[4-(p-anisyl)piperidonomethyl]-3-quinuclidinol;
3-(4-phenylhexahydroazepinomethyl)-3-quinuclidinol;

3-(4-[3,5-di(trifluoromethyl)phenyl]piperidinomethyl)-
3-quinuclidinol;
3-(3-ethylpyrrolidinomethyl)-3-quinuclidinol;
3-[4-(3,5-diaminophenyl)hexahydrazepinomethyl]-3-
quinuclidinol;
3-[4-(m-fluorophenyl)piperidinomethyl]-3-
quinuclidinol;
3-(4-[3,5-di(trifluoromethyl)phenyl]hexahydroazepino-
methyl)-3-quinuclidinol;
3-[4-(p-tolyl)piperidinomethyl]-3-quinuclidinol;
3-[4-(m-ethoxyphenyl)hexahydroazepinomethyl]-3-
quinuclidinol;
3-(3-hexylpyrrolidinomethyl)-3-quinuclidinol;
3-(4-methylpiperidinomethyl)-3-quinuclidinol;
3-[4-(3,5-ethoxyphenyl)piperidinomethyl]-3-
quinuclidinol;
3-[4-(3,5-dihydroxyphenyl)hexahydroazepinomethyl]-
3-quinuclidinol;
3-[4-(p-bromophenyl)piperidinomethyl]-3-quinuclidinol;
3-(3-phenylpyrrolidinomethyl)-3-quinuclidinol;
3-(4-ethylhexahydroazepinomethyl)-3-quinuclidinol;
3-[4-(3,4,5-trichlorophenyl)piperidinomethyl]-3-
quinuclidinol.

EXAMPLE V

3-[(3-azaspiro[5,5]undecino)methyl]-3-quinuclidinol

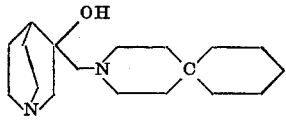

A mixture of I (2.8 g.) and 4,4-spiropentamethylene-
piperidine (1.8 g.) is heated at 200° for twenty minutes.
On cooling, crystallization occurs. Recrystallization of the
solid from hexane gives 2.6 g. of white solid with M.P.
108–114°. Recrystallization of the solid from ethanol-
water gives 1.8 g. of white solid with M.P. 120–123°.
Finally, recrystallization of the solid from hexane gives
1.6 g. of product with M.P. 121–123°.

*Analysis.*—Calcd for $C_{18}H_{32}N_2O$ (percent): C, 73.92;
H, 11.03; N, 9.58. Found (percent): C, 74.29; H, 11.26;
N, 9.91.

In a similar manner, using the appropriate starting ma-
terials, the following compounds are provided:

3-[(2-azaspiro[4,4]nonino)methyl]-3-quinuclidinol;
3-[(2-azaspiro[4,5]decino)methyl]-3-quinuclidinol;
3-[(2-azaspiro[4,6]undecino)methyl]-3-quinuclidinol;
3-[(2-azaspiro[4,7]dodecino)methyl]-3-quinuclidinol;
3-[(3-azaspiro[5,4]decino)methyl]-3-quinuclidinol;
3-[(3-azaspiro[5,6]dodecino)methyl]-3-quinuclidinol;
3-[(3-azaspiro[5,7]tridecino)methyl]-3-quinuclidinol;
3-[(3-azaspiro[6,4]undecino)methyl]-3-quinuclidinol;
3-[(3-azaspiro[6,5]dodecino)methyl]-3-quinuclidinol;
3-[(3-azaspiro[6,6]tridecino)methyl]-3-quinuclidinol;
3-[(3-azaspiro[6,7]tetradecino)methyl]-3-quinuclidinol.

EXAMPLE VI 3-(1,2,3,4-tetrahydroisoquinolinomethyl)-3-quinuclidinol

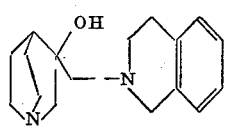

A mixture of I (2.0 g.) and 1.4 g. of tetrahydroiso-
quinoline is heated at 170°±5° for thirty minutes. On
cooling, crystallization occurs. The crystals are triturated
with ether and filtered to give 1.35 g. of white solid prod-
uct with M.P. 113–118°. Recrystallization of the solid
from cyclohexane gives 1.2 g. of product with M.P. 117–
119°.

*Analysis.*—Calcd for $C_{17}H_{24}N_2O$ (percent): C, 74.96;
H, 8.88; N, 10.29. Found (percent): C, 74.67; H, 8.88;
N, 10.27.

In a similar manner, using the appropriate starting ma-
terials, the following compounds are provided:

3-(6-chloro-1,2,3,4-tetrahydroisoquinolinomethyl)-3-
quinuclidinol;
3-(1,2,3,4-tetrahydro-7-methoxyisoquinolinomethyl)-3-
quinuclidinol;
3-(5-hexyl-1,2,3,4-tetrahydroisoquinolinomethyl)-3-
quinuclidinol;
3-(1,2,3,4-tetrahydro-5,7-dimethylisoquinolinomethyl)-3-
quinuclidinol;
3-(6-bromo-8-ethyl-1,2,3,4-tetrahydroisoquinolino-
methyl)-3-quinuclidinol;
3-(5,7-diamino-1,2,3,4-tetrahydroisoquinolinomethyl)-
3-quinuclidinol;
3-(1,2,3,4-tetrahydro-7-iodoisoquinolinomethyl)-3-
quinuclidinol;
3-(6-trifluoromethyl-1,2,3,4-tetrahydroisoquinolino-
methyl)-3-quinuclidinol;
3-(1,2,3,4-tetrahydro-5,6,7-trimethylisoquinolino-
methyl)-3-quinuclidinol;
3-(1,2,3,4-tetrahydro-7,8-diiodoisoquinolinomethyl)-3-
quinuclidinol;
3-(6,8-diamino-1,2,3,4-tetrahydroisoquinolinomethyl)-3-
quinuclidinol;
3-(1,2,3,4-tetrahydro-7-hydroxyisoquinolinomethyl)-3-
quinuclidinol;
3-(1,2,3,4-tetrahydro-7-methylisoquinolinomethyl)-3-
quinuclidinol;
3-(5,6,7-trichloro-1,2,3,4-tetrahydroisoquinolinomethyl)-
3-quinuclidinol;
3-(1,2,3,4-tetrahydro-5,6,7-trimethoxyisoquinolino-
methyl)-3-quinuclidinol;
3-(6-fluoro-1,2,3,4-tetrahydroisoquinolinomethyl)-3-
quinuclidinol;
3-(5-chloro-1,2,3,4-tetrahydro-7-methylisoquinolino-
methyl)-3-quinuclidinol;
3-(1,2,3,4-tetrahydro-6,7-dihydroxyisoquinolino-
methyl)-3-quinuclidinol;
3-(7-ethoxy-1,2,3,4-tetrahydroisoquinolinomethyl)-
3-quinuclidinol;
3-(6-amino-1,2,3,4-tetrahydroisoquinolinomethyl)-3-
quinuclidinol;
3-[6,8-di(trifluoromethyl)-1,2,3,4-tetrahydroiso-
quinolinomethyl]-3-quinuclidinol;
3-(6-bromo-1,2,3,4-tetrahydroisoquinolinomethyl)-3-
quinuclidinol;
3-(7-ethyl-1,2,3,4-tetrahydroisoquinolinomethyl)-3-
quinuclidinol;
3-(6,7-dibromo-1,2,3,4-tetrahydroisoquinolinomethyl)-
3-quinuclidinol;
3-(7,8-diethoxy-1,2,3,4-tetrahydroisoquinolinomethyl)-
3-quinuclidinol;
3-(7,8-diethyl-1,2,3,4-tetrahydroisoquinolinomethyl)-
3-quinuclidinol;
3-(6-ethyl-1,2,3,4-tetrahydro-7-hydroxyisoquinolino-
methyl)-3-quinuclidinol.

EXAMPLE VII 3-diethylaminomethyl-3-quinuclidinol

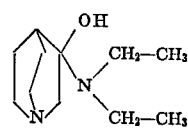

A mixture of 5.0 g. of I and 4.0 g. of diethylamine
(about 6 ml.) is heated at the reflux temperature of the
mixture for ten minutes and allowed to stand overnight.
The crystalline mass which forms is filtered out and re-
crystallized from cyclohexane.

In a similar manner, using the appropriate starting materials, the following compounds are provided:

3-benzylaminomethyl-3-quinuclidinol;
3-di(p-anisyl)methylaminomethyl-3-quinuclidinol;
3-(p-chlorobenzyl)aminomethyl-3-quinuclidinol;
3-di(m-tolyl)aminomethyl-3-quinuclidinol;
3-dipropylaminomethyl-3-quinuclidinol;
3-[2-(methoxyphenyl)ethylaminomethyl]-3-quinuclidinol;
3-(p-methylbenzyalminomethyl)-3-quinuclidinol;
3-(2,2-[di(p-trifluoromethyl)phenyl]ethylaminomethyl)-3-quinuclidinol;
3-[2-(p-tolyloxy)ethylaminomethyl]-3-quinuclidinol;
3-[N-(p-chlorophenyl)propylaminomethyl]-3-quinuclidinol;
3-[di(m-iodophenyl)methylaminomethyl]-3-quinuclidinol;
3-isopropylaminomethyl-3-quinuclidinol;
3-[2-(p-bromophenyloxy)ethylaminomethyl]-3-quinuclidinol;
3-[3-(3,5-diethoxyphenyloxy)propylaminomethyl]3-quinuclidinol;
3-(3,5-diethoxybenzylaminomethyl)-3-quinuclidinol;
3-[2-(3,4-diethylphenyloxy)ethylaminomethyl]-3-quinuclidinol;
3-(N-ethyl-diphenylmethylaminomethyl)-3-quinuclidinol;
3-[2-(phenyl)ethylaminomethyl]-3-quinuclidinol;
3-(dihexylaminomethyl)-3-quinuclidinol;
3-[di(3,5-dichlorophenyl)methylaminomethyl]-3-quinuclidinol;
3-[2-(3,4,5-trimethylphenyloxy)ethylaminomethyl]-3-quinuclidinol;
3-(m-aminobenzylaminomethyl)-3-quinuclidinol;
3-[2-(p-iodophenyloxy)ethylaminomethyl]-3-quinuclidinol;
3-[2-(3,4,5-trifluorophenyl)ethylaminomethyl]-3-quinuclidinol;
3-[2-(m-anisyloxy)ethylaminomethyl]-3-quinuclidinol;
3-(2,2-[di(3,5-dimethylphenyl)ethyl]aminomethyl)-3-quinuclidinol;
3-[2-(3,4,5-trifluorophenyloxy)ethylaminomethyl]-3-quinuclidinol;
3-[2-(p-chlorophenyloxy)ethylaminomethyl]-3-quinuclidinol;
3-(N-ethyl-phenylaminomethyl)-3-quinuclidinol;
3-(3,4,5-trimethylbenzylaminomethyl)-3-quinuclidinol;
3-(2-[3,5-di(trifluoromethyl)phenyloxy]ethylaminomethyl)-3-quinuclidinol;
3-[2,2-di(3,5-dihydroxyphenyl)ethylaminomethyl]-3-quinuclidinol;
3-(2-phenyloxyethylaminomethyl)-3-quinuclidinol;
3-[2-(3,5-diaminophenyl)ethylaminomethyl]-3-quinuclidinol;
3-[2-(m-ethylphenyl)ethylaminomethyl]-3-quinuclidinol;
3-[4-(phenoxy)butylaminoethyl]-3-quinuclidinol;
3-[2-(3,4,5-trimethoxyphenyloxy)ethylaminomethyl]-3-quinuclidinol;
3-[2-(m-hydroxyphenyloxy)ethylaminomethyl]-3-quinuclidinol;
3-ethylaminomethyl-3-quinuclidinol;
3-[3-(p-aminophenyloxy)propylaminomethyl]-3-quinuclidinol;
3-[N-ethyl-2-(p-tolyloxy)ethylaminomethyl]-3-quinuclidinol;
3-(p-methoxybenzylaminomethyl)-3-quinuclidinol;
3-(m-hydroxybenzylaminomethyl)-3-quinuclidinol;
3-[3,3-di(p-fluorophenyl)propylaminomethyl]-3-quinuclidinol;
3-[3-(p-bromophenyl)propylaminomethyl]-3-quinuclidinol;
3-diphenylmethylaminophenyl-3-quinuclidinol;
3-methylaminomethyl-3-quinuclidinol;
3-aminomethyl-3-quinuclidinol.

EXAMPLE VIII

3-[N-ethyl-2-(diethylamino)ethylaminomethyl]-3-quinuclidinol

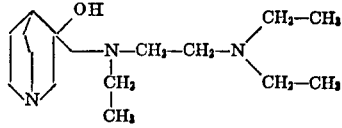

A mixture of 6.0 g. of I and 5.0 g. of N,N,N'-triethyl-ethylenediamine are heated at 180° for thirty minutes. Upon cooling, crystals form, which are filtered out and recrystallized from cyclohexane.

In a similar manner, using the appropriate starting materials, the following compounds are provided:

3-dimethylaminoethylaminomethyl-3-quinuclidinol;
3-[N-propyl-4-(hexahydroazepino)butylaminomethyl]-3-quinuclidinol;
3-[N-methyl-3-(diethylamino)propylaminomethyl]-3-quinuclidinol;
3-[2-(octahydroazocino)ethylaminomethyl]-3-quinuclidinol;
3-[3-(piperidino)propylaminomethyl]-3-quinuclidinol;
3-[N-methyl-3-(octahydroazonino)propylaminomethyl]-3-quinuclidinol;
3-[4-(dipropylamino)butylaminomethyl]-3-quinuclidinol;
3-[N-hexyl-2-(pyrrolidino)ethylaminomethyl]-3-quinuclidinol.

EXAMPLE IX 3-morpholinomethyl-3-quinuclidinol

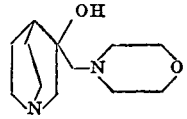

A mixture of 5.0 g. of I and 4.0 g. of morpholine are heated at reflux temperature for thirty minutes and allowed to stand overnight at room temperature. The resultant partially crystalline mass is triturated with dichloromethane and filtered to provide a crystalline substance.

EXAMPLE X 3-(4-phenylpiperazinomethyl)-3-quinuclidinol hydrochloride

An ethereal solution of 2.0 g. of 3-(4-phenylpiperazinomethyl)-3-quinuclidinol, prepared as in Example II, is treated with excess isopropanolic hydrogen chloride and the resulting solid is washed with ether and with acetone. The title salt is recrystallized from isopropanol.

In a similar manner, using the appropriate starting materials, the following salts are provided:

3-(3,3-diphenylpiperazinomethyl)-3-quinuclidinol, hydrochloride;
3-(4-phenylpiperidinomethyl)-3-quinuclidinol, hydrochloride;
3-[(3-azaspiro[5,5]undecino)methyl]-3-quinuclidinol, sulfate;
3-(1,2,3,4-tetrahydroisoquinolinomethyl)-3-quinuclidinol, citrate;
3-diethylaminomethyl-3-quinuclidinol, phosphate;
3-[N-ethyl-2-(diethylamino)ethylaminomethyl]-3-quinuclidinol, maleate;
3-morpholinomethyl-3-quinuclidinol, benzoate.

What is claimed is:
1. 3 - (1,2,3,4 - tetrahydroisoquinolinomethyl) - 3 - quinuclidinol.

References Cited
UNITED STATES PATENTS 3,726,877   4/1973   Elkin _____ 260—288 R DONALD G. DAUS, Primary Examiner